(12) United States Patent
Okawachi (10) Patent No.: US 10,081,242 B2
(45) Date of Patent: Sep. 25, 2018

(54) FUEL CELL VEHICLE

(71) Applicant: TOYOTA JIDOSHA KABUSHIKI KAISHA, Toyota-shi, Aichi-ken (JP)

(72) Inventor: Eiji Okawachi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/435,712

(22) Filed: Feb. 17, 2017

(65) Prior Publication Data

US 2017/0240039 A1 Aug. 24, 2017

(30) Foreign Application Priority Data

Feb. 22, 2016 (JP) .................. 2016-031289

(51) Int. Cl.
*B60K 15/03* (2006.01)
*B60K 15/063* (2006.01)
(Continued)

(52) U.S. Cl.
CPC .......... *B60K 15/03006* (2013.01); *B60K 1/00* (2013.01); *B60K 15/063* (2013.01); *B60K 15/07* (2013.01); *B60L 11/1881* (2013.01); *B60K 2001/001* (2013.01); *B60K 2015/03026* (2013.01); *B60K 2015/03144* (2013.01); *B60K 2015/03296* (2013.01);
(Continued)

(58) Field of Classification Search
CPC .... B60K 15/03006; B60K 2015/03144; B60K 15/063; B60K 2015/0631; B60K 2015/0633; B60K 2015/0634; B60K 15/067
See application file for complete search history.

(56) References Cited

U.S. PATENT DOCUMENTS 6,182,717 B1 * 2/2001 Yamashita ....... B60K 15/03006
141/18
8,820,451 B2 * 9/2014 Matsumoto .............. B60K 1/04
180/65.1
(Continued)

FOREIGN PATENT DOCUMENTS

DE   10 2009 039 079 A1   3/2011
JP   2014-151805          8/2014
(Continued)

*Primary Examiner* — Brian L Swenson
(74) *Attorney, Agent, or Firm* — Finnegan, Henderson, Farabow, Garrett & Dunner, LLP (57) ABSTRACT

A fuel cell vehicle includes a first tank, a second tank, first and second valves for releasing gas, a gas passage for supplying gas to a fuel cell via the first and second valves, a pressure-reducing valve for decompressing the gas, side members disposed on the respective sides of the vehicle, and a motor disposed rearward of the second tank and configured to drive wheels. The first tank is not disposed downstream of the second tank, on the gas passage. The pressure-reducing valve is disposed in a region located rearward of a rear end of the second tank in a vehicle front-rear direction, forward of a rear end of the motor in the vehicle front-rear direction, and between one of the side members and an extended line extended in the vehicle front-rear direction from a side wall of the motor. The pressure-reducing valve is disposed on the second valve side.

14 Claims, 5 Drawing Sheets

(51) Int. Cl.
*B60L 11/18* (2006.01)
*B60K 1/00* (2006.01)
*B60K 15/07* (2006.01)

(52) U.S. Cl.
CPC ............... *B60K 2015/03315* (2013.01); *B60K 2015/03328* (2013.01); *B60K 2015/0633* (2013.01); *B60K 2015/0634* (2013.01); *B60K 2015/0635* (2013.01)

(56) References Cited

U.S. PATENT DOCUMENTS

| | | | |
|---|---|---|---|
| 8,944,469 B2* | 2/2015 | Mulanon | F17C 13/084 280/834 |
| 2003/0146214 A1* | 8/2003 | Idoguchi | F17C 1/00 220/23.83 |
| 2004/0155449 A1* | 8/2004 | Hashimura | B60K 15/063 280/785 |
| 2009/0269624 A1* | 10/2009 | Hwang | B60K 15/013 429/421 |
| 2011/0139534 A1* | 6/2011 | Klimek | B60K 1/04 180/309 |
| 2011/0180551 A1* | 7/2011 | Handa | B60K 15/03006 220/592.2 |
| 2012/0080250 A1* | 4/2012 | Ohashi | B60K 1/04 180/65.31 |
| 2016/0200191 A1* | 7/2016 | Ito | B60K 15/073 280/834 |
| 2017/0120738 A1* | 5/2017 | Landgraf | B60L 11/1887 |

FOREIGN PATENT DOCUMENTS

| | | |
|---|---|---|
| JP | 2014-213817 | 11/2014 |
| WO | WO 2010/140256 A1 | 12/2010 |

* cited by examiner

FUEL CELL VEHICLE

INCORPORATION BY REFERENCE

The disclosure of Japanese Patent Application No. 2016-031289 filed on Feb. 22, 2016 including the specification, drawings and abstract is incorporated herein by reference in its entirety.

BACKGROUND

1. Technical Field

The disclosure relates to a fuel cell vehicle.

2. Description of Related Art

For example, German Patent Application Publication No. 102009039079 (DE 102009039079 A1) describes a fuel cell vehicle including a first tank, a second tank, and a motor. The first tank storing hydrogen fuel is disposed such that the longitudinal direction of the first tank coincides with the vehicle front-rear direction. The second tank is disposed rearward of the first tank such that the longitudinal direction of the second tank coincides with the vehicle transverse direction (i.e., vehicle right-left direction). In addition, a motor is disposed rearward of the second tank.

In addition, a fuel cell vehicle is provided with a pressure-reducing valve in order to reduce the pressure of fuel gas when the fuel gas is supplied from a tank to a fuel cell. In the fuel cell vehicle, gas supplied from the tank has a high pressure, and thus a high-pressure pipe is usually used as a flow passage extending to the pressure-reducing valve. Because the high-pressure pipe needs to have a high strength, the high-pressure pipe is large in volume and involves a high cost. In order to ensure a sufficient space in a vehicle cabin and to promote cost reduction, usually, the pressure-reducing valve is disposed in a manner such that the pipe length of the high-pressure pipe extending from the tank to the pressure-reducing valve is made as short as possible.

SUMMARY

However, a pressure-reducing valve is disposed between tanks in order to reduce the pipe length of a fuel supply pipe extending from the tanks to the pressure-reducing valve, in some cases. In this case, in the event of a frontal collision or a rear-end collision of a vehicle, the pressure-reducing valve may be damaged due to an impact. In particular, when the tanks are disposed such that the longitudinal direction of the tanks coincides with the vehicle front-rear direction, the surface pressure applied from the tanks increases, and thus the possibility that the pressure-reducing valve will be damaged increases.

The disclosure provides a fuel cell vehicle configured to reduce the possibility that a pressure-reducing valve will be damaged in the event of, for example, a frontal collision or a rear-end collision of the vehicle.

A fuel cell vehicle according to an aspect of the disclosure includes a first tank, a second tank, a first valve, a second valve, a gas passage, a pressure-reducing valve, side members, and a motor. The first tank is disposed such that the longitudinal direction of the first tank coincides with the vehicle front-rear direction, and the first tank is configured to be filled with gas. The second tank is disposed at a position rearward of the first tank in the vehicle front-rear direction such that the longitudinal direction of the second tank coincides with the vehicle transverse direction, and the second tank is configured to be filled with the gas. The first valve is configured to release the gas from the first tank, and the first tank is provided with the first valve. The second valve is configured to release the gas from the second tank, and the second tank is provided with the second valve. The gas is supplied through the gas passage to a fuel cell via the first valve and the second valve. The pressure-reducing valve is configured to decompress the gas. One of the side members is disposed on one side of the fuel cell vehicle, and the other one of the side members is disposed on the other side of the fuel cell vehicle. The motor is disposed at a position rearward of the second tank, and the motor is configured to drive wheels. The first tank is not disposed downstream of the second tank, on the gas passage. The pressure-reducing valve is disposed in a region that is located rearward of a rear end of the second tank in the vehicle front-rear direction, forward of a rear end of the motor in the vehicle front-rear direction, and between one of the side members and an extended line extended in the vehicle front-rear direction from a side wall of the motor in the vehicle transverse direction. The pressure-reducing valve is disposed on a side on which the second valve of the second tank is disposed.

With this configuration of the fuel cell vehicle, the pressure-reducing valve is less likely to be sandwiched between the motor and the second tank in the event of a frontal collision or a rear-end collision. In addition, in the event of a rear-end collision, the pressure-reducing valve does not directly receive an impact, and the motor can absorb the impact. Thus, the pressure-reducing valve is prevented from directly receiving the impact. As a result, the possibility that the pressure-reducing valve will be damaged is reduced. In addition, it is possible to make the length of a pipe that connects the second tank to the pressure-reducing valve as short as possible, while reducing damage due to a collision.

The pressure-reducing valve may be secured to the one of the side members.

The pressure-reducing valve is secured to the one of the side members as described above. Thus, the pressure-reducing valve is displaced in accordance with the deformation of the one of the side members. As a result, it is possible to restrain the pressure-reducing valve from coming into contact with a side collision object.

In this case, the pressure-reducing valve may be secured to the one of the side members via a securing member.

With this arrangement, when a collision object comes into contact with the side member, it is possible to restrain an impact from being directly transferred to the pressure-reducing valve.

The pressure-reducing valve may be secured at a position inwardly apart from the side member by the securing member.

With this arrangement, it is possible to further reliably restrain the pressure-reducing valve from coining into contact with a side collision object.

The first tank may be disposed in a center tunnel.

With this arrangement, it is possible to efficiently use a space in the vehicle.

The second tank may be disposed under a rear seat.

With this arrangement, it is possible to obtain more space in a rear portion of the vehicle, in which the motor is mounted.

The fuel cell vehicle may be a vehicle in which rear wheels are driven by the motor.

Thus, it is possible to shorten the distance over which the power is transferred from the motor to the drive wheels. Thus, it is possible to reduce the size of a driving mechanism.

According to the disclosure, it is possible to reduce the possibility that the pressure-reducing valve will be damaged in the event of a frontal collision or a rear-end collision.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, the configuration of a fuel cell vehicle according to an example embodiment of the disclosure will be described in detail with reference to the accompanying drawings.

A fuel cell vehicle 100 according to the present embodiment is a rear-wheel drive vehicle. The fuel cell vehicle 100 includes a front tank 1, a rear tank 2, a pressure-reducing valve 3, side members 4, a motor 5, wheels (front wheels 6F and rear wheels 6R), a fuel cell 10, and so forth.

The front tank 1 and the rear tank 2 are containers to be filled with hydrogen gas used as fuel. In the fuel cell vehicle 100 according to the present embodiment, the front tank 1 is disposed longitudinally at a position in a center tunnel CT under a floor panel FP such that the longitudinal direction of the front tank 1 coincides with the vehicle front-rear direction (the forward-backward traveling direction) (refer to FIG. 2 and FIG. 3). The rear tank 2 is transversely disposed at a position rearward of the front tank 1 such that the longitudinal direction of the rear tank 2 coincides with the vehicle transverse direction (i.e., vehicle right-left direction) (refer to FIG. 2). Such an arrangement in which the front tank 1 and the rear tank 2 are disposed in a T-shape is preferable in terms of efficient use of a space in the vehicle.

Figure 2:
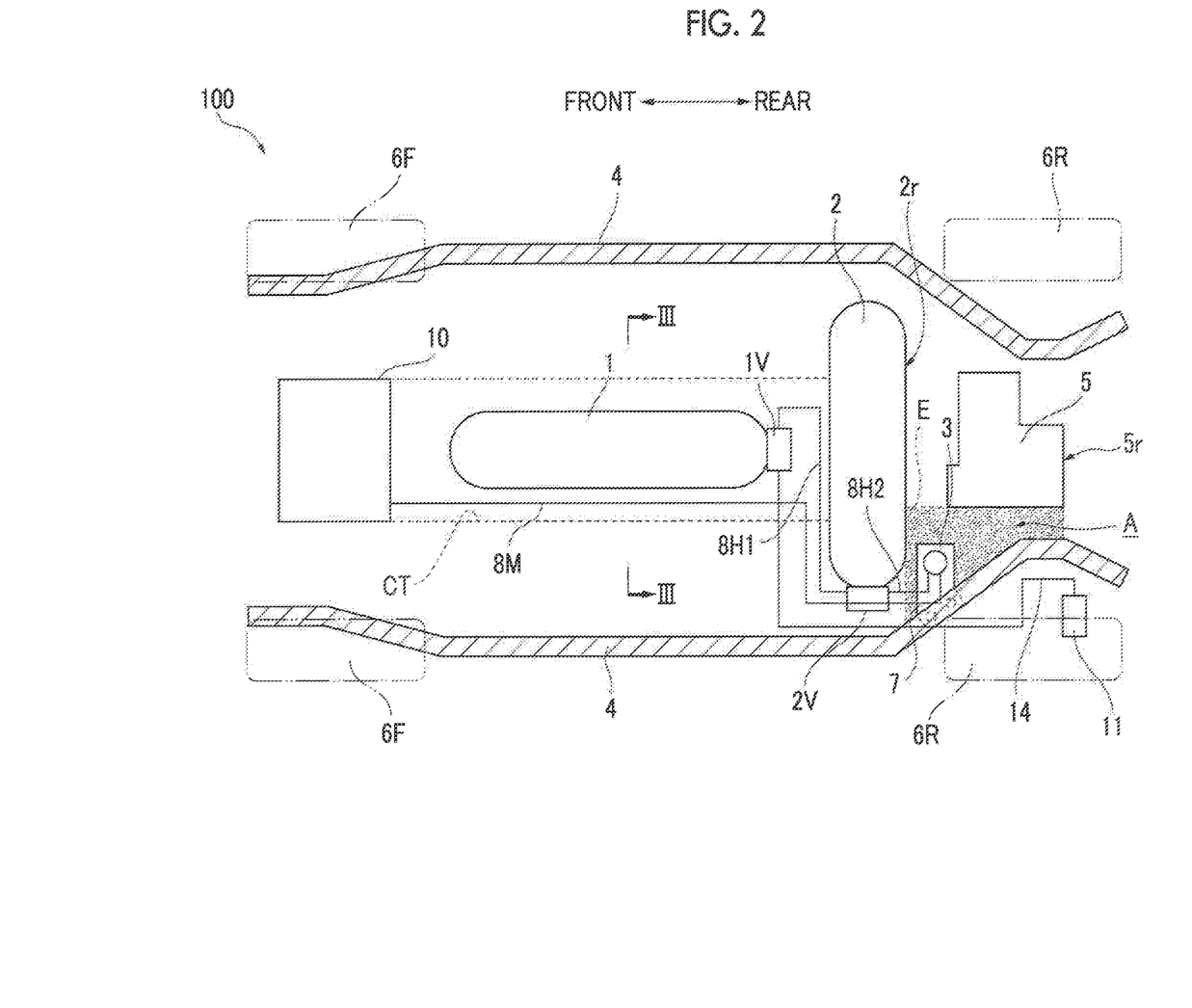
FIG. 2 is a plan view schematically illustrating the configuration of the fuel cell vehicle.
Figure 3:
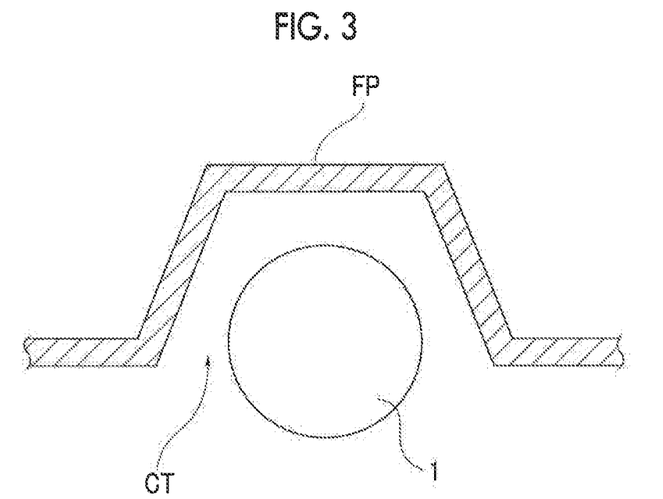
FIG. 3 is a view schematically illustrating the structure in a section taken along line III-III in FIG. 2.

The front tank 1 is provided with a valve 1V configured to release the gas from the front tank 1, and the rear tank 2 is provided with a valve 2V configured to release the gas from the rear tank 2 (refer to, for example, FIG. 2). The front tank 1 and the rear tank 2 are connected to each other via a first high-pressure pipe 8H1. The rear tank 2 is connected to the pressure-reducing valve 3 via a second high-pressure pipe 8H2. A gas supply pipe 14 leading to a hydrogen gas supply port 11 is connected to the front tank 1. With this structure, cooled hydrogen gas is supplied first into the front tank 1 that is relatively large in size. Thus, it is possible to curb an increase in the temperature of the front tank 1 that is likely to undergo a temperature increase due to its large size.

Figure 1:
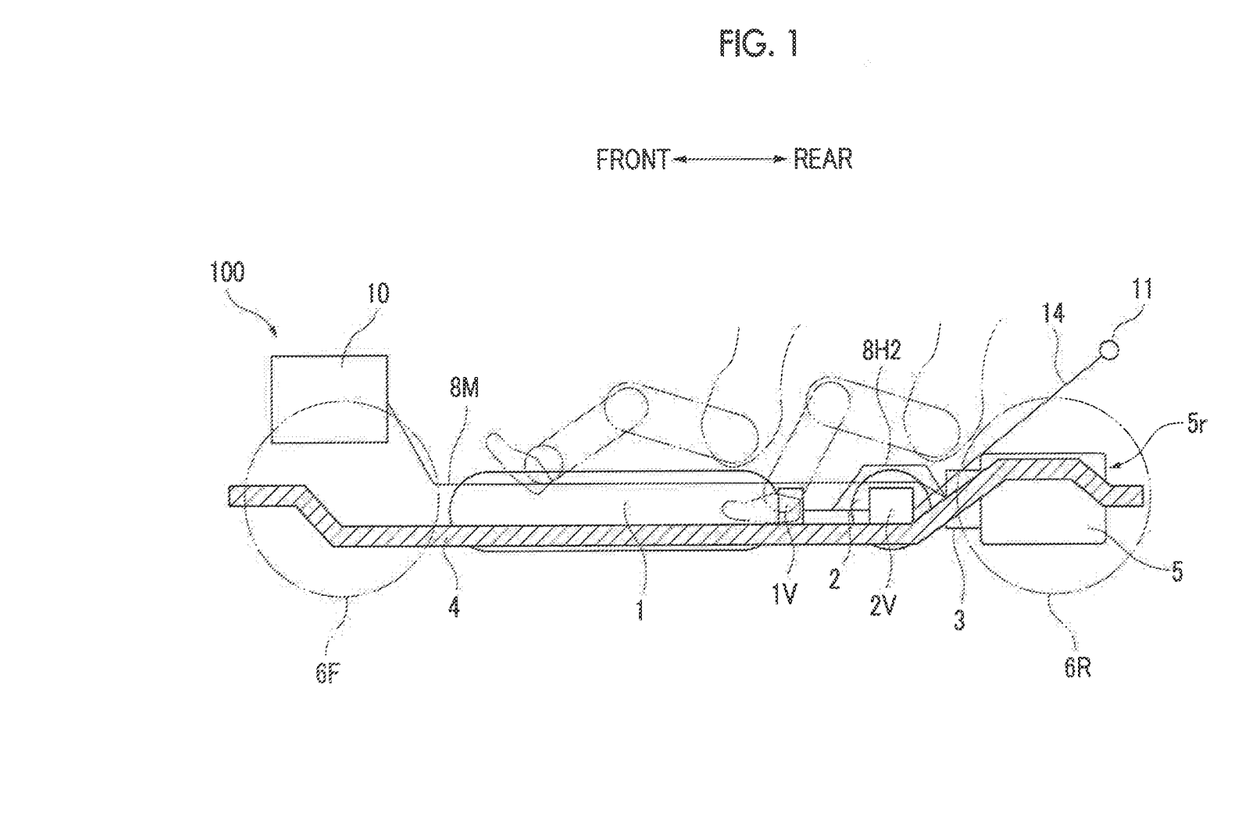
FIG. 1 is a side view illustrating the configuration of a fuel cell vehicle according to a first embodiment of the disclosure.

The pressure-reducing valve 3 decompresses the hydrogen gas to be supplied to the fuel cell 10 from the front tank 1 via the valve 1V, and decompresses the hydrogen gas to be supplied to the fuel cell 10 from the rear tank 2 via the valve 2V. The decompressed hydrogen gas is supplied to the fuel cell 10 through a medium-pressure pipe 8M (refer to FIG. 1 and FIG. 2).

One of the side members 4 is provided on one side of the fuel cell vehicle 100, and the other one of the side members 4 is provided on the other side of the fuel cell vehicle 100. The side members 4 extend in the vehicle front-rear direction (refer to FIG. 1 and FIG. 2). The side members 4 in the present embodiment have such a bent shape that the front portion and rear portion of the fuel cell vehicle 100 become narrower in the vehicle-width direction (refer to FIG. 2).

The motor 5 is a drive source for driving the wheels. The fuel cell vehicle 100 in the present embodiment is a rear-wheel drive vehicle in which the rear wheels 6R are driven by the motor 5 (refer to, for example, FIG. 1). The motor 5 in the present embodiment is disposed rearward of the rear tank 2 (refer to FIG. 1 and FIG. 2). Note that, "motor" in the specification includes, for example, a cover, a casing, or a housing of the motor.

Figure 4:
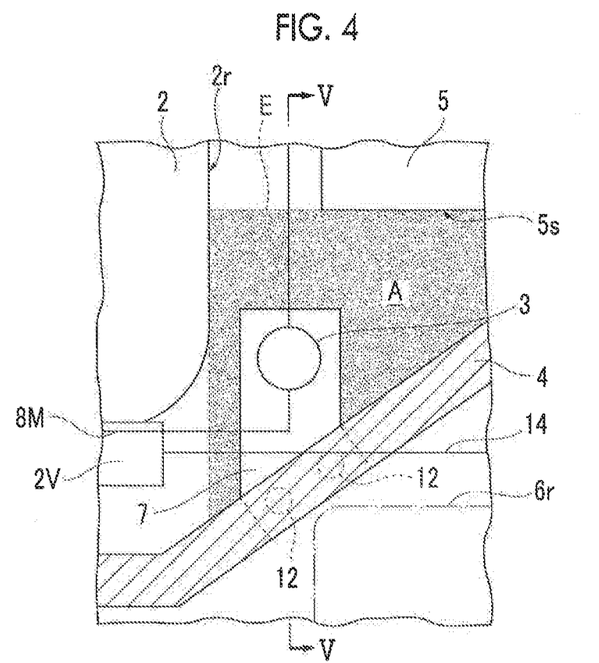
FIG. 4 is an enlarged plan view illustrating the configurations of a pressure-reducing valve and its surroundings.

The pressure-reducing valve 3 in the present embodiment is disposed in a prescribed region, that is, a region A that is located rearward of a rear end 2r of the rear tank 2, forward of a rear end 5r of the motor 5, and between an extended line E extended from a side wall 5s of the motor 5 in the vehicle front-rear direction and the side member 4 (refer to FIG. 2 and FIG. 4). With this arrangement, for example, even when a rear-end collision of the fuel cell vehicle 100 occurs (e.g., another vehicle collides with the rear of the fuel cell vehicle 100), the pressure-reducing valve 3 is not sandwiched between the motor 5 and the rear tank 2. For example, a motor including a hard housing or a motor having a heavy weight may be used as the motor 5. Even in these cases, it is possible to avoid the situation where the motor 5 hits the pressure-reducing valve 3 and thus the pressure-reducing valve 3 is significantly damaged.

Furthermore, in the present embodiment, the pressure-reducing valve 3 is disposed rearward of the rear tank 2 as described above. Thus, it is easy to obtain a space at a position forward of the rear tank 2. The space allows occupants to more smoothly get on and off the vehicle and improves the occupant comfort. The space is used as, for example, a foot space for occupant getting on the vehicle.

In addition, the pressure-reducing valve 3 in the present embodiment is secured to the side member 4, and is located in a region between the extended line E extended from the side wall 5s of the motor 5 in the vehicle front-rear direction and the side member 4 (refer to, for example, FIG. 2). With this arrangement, even when a side collision of the fuel cell vehicle 100 occurs (e.g., another vehicle collides with the side portion of the fuel cell vehicle 100) and the side member 4 is deformed, the pressure-reducing valve 3 itself is displaced together with the side member 4 as the side member 4 is deformed, so that the pressure-reducing valve 3 is restrained from coming into contact with another member, such as a side collision object.

Figure 5:
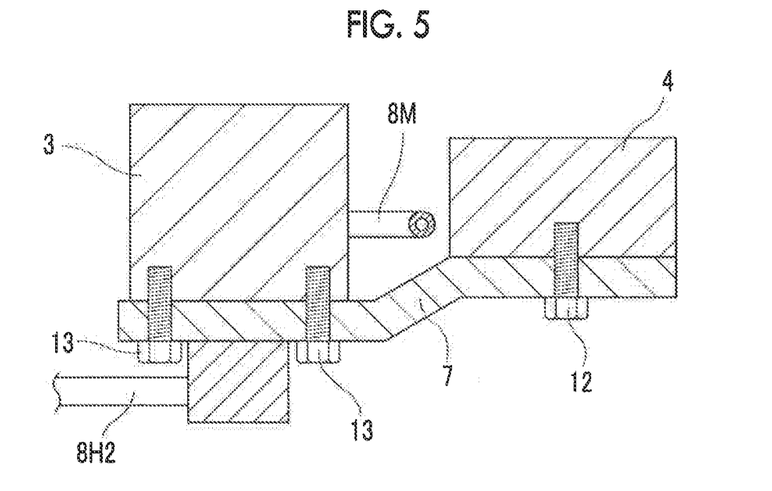
FIG. 5 is a sectional view taken along line V-V in FIG. 4.

The method or manner for securing the pressure-reducing valve 3 to the side member 4 is not limited to any particular method or manner. For example, in the present embodiment, the pressure-reducing valve 3 is secured to the side member 4 via a bracket 7 (an example of "securing member") (refer to FIG. 4 and FIG. 5). With this arrangement, it is possible to restrain a collision impact from being transferred directly to the pressure-reducing valve 3. The bracket 7 is fastened at its one end portion to, for example, the bottom surface of the side member 4 with bolts 12, and the pressure-reducing valve 3 is fastened to the other end portion of the bracket 7 with, for example, bolts 13. The bracket 7 may be fastened at one point to the bottom surface of the side member 4, and the pressure-reducing valve 3 may be fastened at one point to the bracket 7. Note that, the bracket 7 is just an example of a member for securing the pressure-reducing valve 3 to the side member 4, and members having various shapes, such as plate-shaped members or cantilever members having other shapes, may be employed instead of the bracket 7.

It is also preferable to secure the pressure-reducing valve 3 at a position further inwardly apart from the side member 4 by employing a long bracket as the bracket 7. In this case, in the event of, for example, a side collision, the pressure-reducing valve 3 is further reliably restrained from coming into contact with another member, such as a side collision object.

The pressure-reducing valve 3 may be disposed on any one of the right side and the left side in the right-left direction (the width direction) of the fuel cell vehicle 100. However, the pressure-reducing valve 3 is preferably disposed on the side on which the valve 2V of the rear tank 2 is disposed. In this case, the lengths of the pipes for hydrogen gas, such as the second high-pressure pipe 8H2, can be shortened, depending on how the pipes are routed. In addition, it is also preferable to dispose the pressure-reducing valve 3 at such a position that the passage length (total length) of the pipes (the first high-pressure pipe 8H1, the second high-pressure pipe 8H2, and the medium-pressure pipe 8M) becomes shortest, in the case of the structure in which the passage reaches the fuel cell 10 from the valve 1V (or the valve 2V) through the pressure-reducing valve 3.

Figure 6:
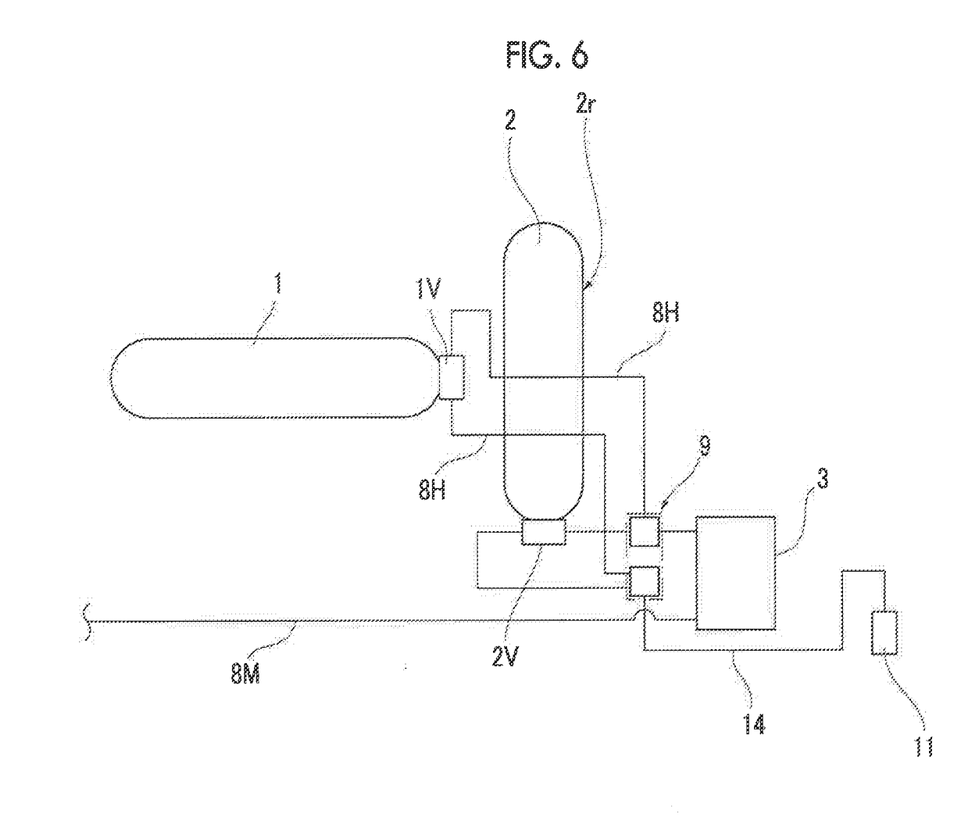
FIG. 6 is a view schematically illustrating an example of the structure in which a three-way valve is disposed downstream of a rear tank.

Although detailed description will not be provided, a three-way valve 9 may be disposed at a position downstream of the rear tank 2 (refer to FIG. 6). In FIG. 6, high-pressure pipes are each indicated by a reference symbol 8H.

As described so far, with the configuration of the fuel cell vehicle 100 according to the present embodiment, when a frontal collision or a rear-end collision occurs, the pressure-reducing valve 3 is less likely to be sandwiched between the motor 5 and the rear tank 2. Thus, it is possible to prevent the pressure-reducing valve 3 from directly receiving an impact. As a result, the possibility that the pressure-reducing valve 3 will be damaged is reduced.

While the foregoing embodiment is an example embodiment of the disclosure, the disclosure is not limited to the foregoing embodiment and various modifications may be made to the foregoing embodiment within the scope of the disclosure. For example, in the foregoing embodiment, the fuel cell vehicle 100 provided with the rear wheels driven by the motor 5 is described, as just an example of a vehicle to which the disclosure is applied. Needless to say, the disclosure may be applied to, for example, a front-wheel drive (FWD) vehicle.

In the foregoing embodiment, the fuel cell vehicle 100 in which the two tanks (the front tank 1 and the rear tank 2) are arranged in a T-shape is described. However, this arrangement is just an example of the arrangement for efficiently using the space in the vehicle. That is, in the fuel cell vehicle 100 described above, the front tank 1 is disposed longitudinally at a position under the floor in order to more efficiently use the space in the vehicle, and the rear tank 2 is disposed transversely at a position under the rear seat to obtain more space in a rear portion of the vehicle (refer to, for example, FIG. 1). However, this arrangement is just an example of tank arrangement. Needless to say, the disclosure may be applied to fuel cell vehicles 100 with other tank arrangements.

In the foregoing embodiment, the arrangement in which the front tank 1 is longitudinally disposed in the vehicle front-rear direction and the rear tank 2 is transversely disposed in the vehicle transverse direction is described. Needless to say, the disclosure may be applied also to a case where the vehicle front-rear direction is a direction that is slightly tilted in the right-left direction due to, for example, design, in addition to a case where the vehicle front-rear direction is a vehicle front-rear direction in a strict sense. Therefore, the arrangement of the front tank 1 is not limited to an arrangement in which the longitudinal direction of the front tank 1 coincides with the vehicle front-rear direction in a strict sense. Similarly, the arrangement of the rear tank 2 is not limited to an arrangement in which the longitudinal direction of the rear tank 2 coincides with the vehicle transverse direction in a strict sense.

The disclosure is preferably applied to a fuel cell vehicle including a fuel cell.

What is claimed is:

1. A fuel cell vehicle comprising:
   a first tank disposed such that a longitudinal direction of the first tank coincides with a vehicle front-rear direction, the first tank being configured to be filled with gas;
   a second tank disposed at a position rearward of the first tank in the vehicle front-rear direction such that a longitudinal direction of the second tank coincides with a vehicle transverse direction, the second tank being configured to be filled with the gas;
   a first valve configured to release the gas from the first tank, the first valve being provided on the first tank;
   a second valve configured to release the gas from the second tank, the second valve being provided on the second tank;
   a gas passage through which the gas is supplied to a fuel cell via the first valve and the second valve;
   a pressure-reducing valve configured to decompress the gas;
   side members one of which is disposed on one side of the fuel cell vehicle, and the other one of which is disposed on the other side of the fuel cell vehicle; and
   a motor disposed at a position rearward of the second tank, the motor being configured to drive wheels, wherein
   the first tank is not disposed downstream of the second tank, on the gas passage, and
   the pressure-reducing valve is disposed in a region that is located rearward of a rear end of the second tank in the vehicle front-rear direction, forward of a rear end of the motor in the vehicle front-rear direction, and between one of the side members and an extended line extended in the vehicle front-rear direction from a side wall of the motor in the vehicle transverse direction, and the pressure-reducing valve is disposed on a side on which the second valve of the second tank is disposed.

2. The fuel cell vehicle according to claim 1, wherein the pressure-reducing valve is secured to the one of the side members.

3. The fuel cell vehicle according to claim 2, wherein the pressure-reducing valve is secured to the one of the side members via a securing member.

4. The fuel cell vehicle according to claim 3, wherein the pressure-reducing valve is secured at a position inwardly apart from the side member by the securing member.

5. The fuel cell vehicle according to claim 1, wherein the first tank is disposed in a center tunnel.

6. The fuel cell vehicle according to claim 1, wherein the second tank is disposed under a rear seat.

7. The fuel cell vehicle according to claim 1, wherein rear wheels are driven by the motor.

8. A fuel cell vehicle comprising:
- a first tank disposed such that a longitudinal direction of the first tank coincides with a vehicle front-rear direction, the first tank being configured to be filled with gas;
- a second tank disposed at a position rearward of the first tank in the vehicle front-rear direction such that a longitudinal direction of the second tank coincides with a vehicle transverse direction, the second tank being configured to be filled with the gas;
- a first valve configured to release the gas from the first tank, the first valve being provided on the first tank;
- a second valve configured to release the gas from the second tank, the second valve being provided on the second tank;
- a gas passage through which the gas is supplied to a fuel cell via the first valve and the second valve;
- a pressure-reducing valve configured to decompress the gas;
- side members one of which is disposed on one side of the fuel cell vehicle, and the other one of which is disposed on the other side of the fuel cell vehicle; and
- a motor disposed at a position rearward of the second tank, the motor being configured to drive wheels, wherein
- the first tank is not disposed downstream of the second tank, on the gas passage, and
- the pressure-reducing valve is completely disposed in a region that is located rearward of a rear end of the second tank in the vehicle front-rear direction, forward of a rear end of the motor in the vehicle front-rear direction, and between one of the side members and an extended line extended in the vehicle front-rear direction from a side wall of the motor in the vehicle transverse direction, and the pressure-reducing valve is disposed on a side on which the second valve of the second tank is disposed.

9. The fuel cell vehicle according to claim 8, wherein the pressure-reducing valve is secured to the one of the side members.

10. The fuel cell vehicle according to claim 9, wherein the pressure-reducing valve is secured to the one of the side members via a securing member.

11. The fuel cell vehicle according to claim 10, wherein the pressure-reducing valve is secured at a position inwardly apart from the side member by the securing member.

12. The fuel cell vehicle according to claim 8, wherein the first tank is disposed in a center tunnel.

13. The fuel cell vehicle according to claim 8, wherein the second tank is disposed under a rear seat.

14. The fuel cell vehicle according to claim 8, wherein rear wheels are driven by the motor.

* * * * *